United States Patent [19]

Willis, Jr. et al.

[11] 3,830,056

[45] Aug. 20, 1974

[54] CONVERSION MEANS FOR A GAS TURBINE ENGINE

[75] Inventors: Robert John Willis, Jr., Nahant; Irving Kalikow, Swampscott; Harold John Jordan, Lynnfield; John William Jacobson, Melrose, all of Mass.

[73] Assignee: General Electric Company, Lynn, Mass.

[22] Filed: Dec. 4, 1972

[21] Appl. No.: 311,871

[52] U.S. Cl. ............. 60/39.16 S, 60/39.33, 74/661, 74/DIG. 5
[51] Int. Cl. ............................ F02c 3/10, F02c 7/02
[58] Field of Search......... 60/39.16 R, 39.14, 39.33; 74/DIG. 5, 661

[56] References Cited
UNITED STATES PATENTS

| | | | |
|---|---|---|---|
| 3,100,378 | 8/1963 | Austin et al. | 60/39.16 R |
| 3,280,554 | 10/1966 | Knowles | 60/39.16 R |
| 3,368,347 | 2/1968 | Wickman | 60/39.16 R |
| 3,488,947 | 1/1970 | Miller et al. | 60/39.16 R |
| 3,498,057 | 3/1970 | Kronogard et al. | 60/39.16 R |
| 3,626,692 | 12/1971 | Kumm | 60/39.16 R |
| 3,722,213 | 3/1973 | Carter et al. | 60/39.16 R |

*Primary Examiner*—Carlton R. Croyle
*Assistant Examiner*—Warren Olsen

[57] ABSTRACT

A gas turbine engine of the free power turbine type, in which the power turbine rotates independently of the compressor driving turbine, is provided with conversion means for coupling and decoupling the power turbine from the compressor driving turbine. In the uncoupled mode of operation, the powerplant and its associated load may be quickly accelerated to operating speed with a minimum of externally applied starting torque and energy. Once operating speed is attained, the power turbine may be coupled to the compressor driving turbine in order that transient speed changes of the gas turbine engine in response to changes in the load requirement be maintained at a minimum.

6 Claims, 2 Drawing Figures

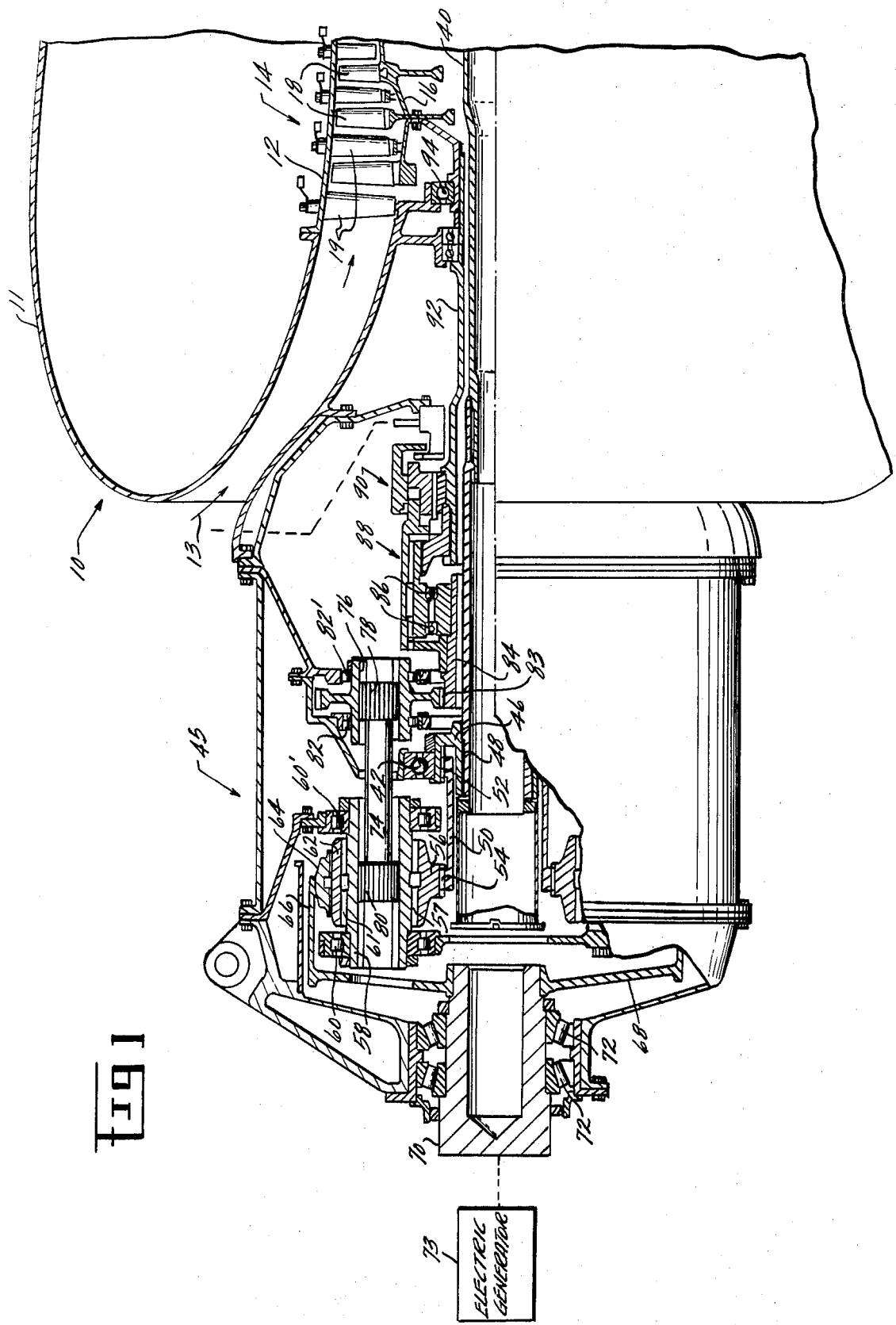

3,830,056

CONVERSION MEANS FOR A GAS TURBINE ENGINE

BACKGROUND OF THE INVENTION

This invention generally relates to conversion means for a gas turbine engine and, more particularly, to conversion means whereby a gas turbine engine may be adapted to power an electrical generator so that the generator can be quickly accelerated to operating speed and still satisfy strict transient response requirements at the operating speed.

Gas turbine engines have been conventionally utilized in the past to drive electrical generators. Most recently it has been suggested to utilize a gas turbine engine to power an emergency generator on an ocean going vessel. The emergency power system must be capable of being fully operative within a very short period of time after failure of the main power system. Therefore, a gas turbine engine used in this manner must be capable of quickly accelerating the emergency generator to operational speed after failure of the main electrical supply system. Once operating, actual transient speed changes of the gas turbine engine in response to electrical load transients must be maintained within narrowly defined limits.

One type of gas turbine powerplant well known in the art is a so-called free power turbine type in which the power turbine itself rotates independently of the compressor driving turbine, that is the two turbines are not mechanically connected to rotate together, but are on dual shafts rotating independently. With such an engine, power to drive the generator would be extracted from the free power turbine.

The free power turbine type of engine with dual shafts is better suited than the more conventional single shaft type of engine for quickly accelerating the electrical generator to its operating speed. An extremely high starting torque together with a large expenditure of energy would have to be applied to the single shaft type of engine in order to achieve the quick acceleration required to drive the emergency generator. The required starting torque is estimated to be so high, in fact, as to demand a starter many times more powerful than any now in existence. The free power turbine type of engine, however, will accelerate rapidly to operating speed with only moderate starting torque and energy; the reason being that the compressor driving turbine is quickly accelerated independently of the free power turbine and electric generator. The resulting high gas pressure, temperature and flow through the compressor driving turbine provide the required high accelerating torque to the free power turbine, rapidly accelerating the free power turbine and emergency generator. Once operating speed is attained, however, the actual transient speed changes of the free power type of engine in response to electrical load transients are considerably greater than with the more conventional single shaft type of engine, the reason being that changes in the electrical load requirements of the generator are reflected back as mechanical load transients on the power turbine. For each change in the mechanical loading on the power turbine, there must be an adjustment in the speed of the compressor driving turbine in order to maintain a uniform output speed. However, acceleration and deceleration times for the compressor driving turbine generally tend to be quite long and therefore inhibit quick responses to load transients.

Such is the dilemma confronting engineers who would like to utilize a gas turbine engine to power an emergency generator. In order to meet the quick acceleration requirements for an emergency generator, it becomes necessary to utilize a free power turbine type of engine with dual shafts; however, once the operating speed is attained, this type of engine generally fails to meet the stringent transient response requirements of a practical electrical generating system.

Therefore, it is a primary object of this invention to provide conversion means for a gas turbine engine in order to make the engine suitable for driving an emergency electrical generator so that the engine and generator may be quickly accelerated to operating speed with only slight initial starting torque provided by a conventional starter.

It is also an object of this invention to provide conversion means for a gas turbine engine in order to make the engine suitable for driving an emergency generator wherein the actual transient speed changes of the gas turbine engine in response to electrical load transients can be maintained within narrowly defined limits.

It is an even further object of this invention to provide a conversion means for a gas turbine engine in order to make the engine suitable for driving an electrical generator wherein the engine, while operating, may be converted from the free power turbine type of engine with dual shafts for quick acceleration to an equivalent single shaft type of engine for satisfying stringent transient response requirements.

SUMMARY OF THE INVENTION

Briefly stated, the above and other related objects are attained by providing a conversion apparatus for a gas turbine engine of the type having a compressor, combustor, compressor driving turbine and power turbine in flow series. The engine also includes a compressor driving shaft connected to the compressor driving turbine and arranged to rotate independently of a power turbine shaft connected to the power turbine. The conversion apparatus comprises a means for coupling and decoupling the compressor driving shaft to the power turbine shaft such that when the two shafts are coupled together there is maintained a uniformly proportionate relationship in the rotational speeds of the two shafts. The conversion apparatus may include a star gear carried for rotation with the power turbine shaft. A plurality of planet gears are circumferentially spaced apart in tooth engaging relation around the star gear for simultaneous rotation with the star gear. A plurality of circumferentially spaced apart pinion gears are axially displaced from the planet gears with each pinion gear connected for simultaneous rotation with a respective planet gear. Gear means are engaged by the plurality of circumferentially spaced apart pinion gears for simultaneous rotation therewith. Means are provided for selectively connecting the gear means to the compressor driving shaft in order that the gear means and compressor driving shaft rotate at identical speed.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1A is a partial cross-sectional view of the remaining portion of the gas turbine engine of FIG. 1.

DESCRIPTION OF THE PREFERRED EMBODIMENT

Figure 1:
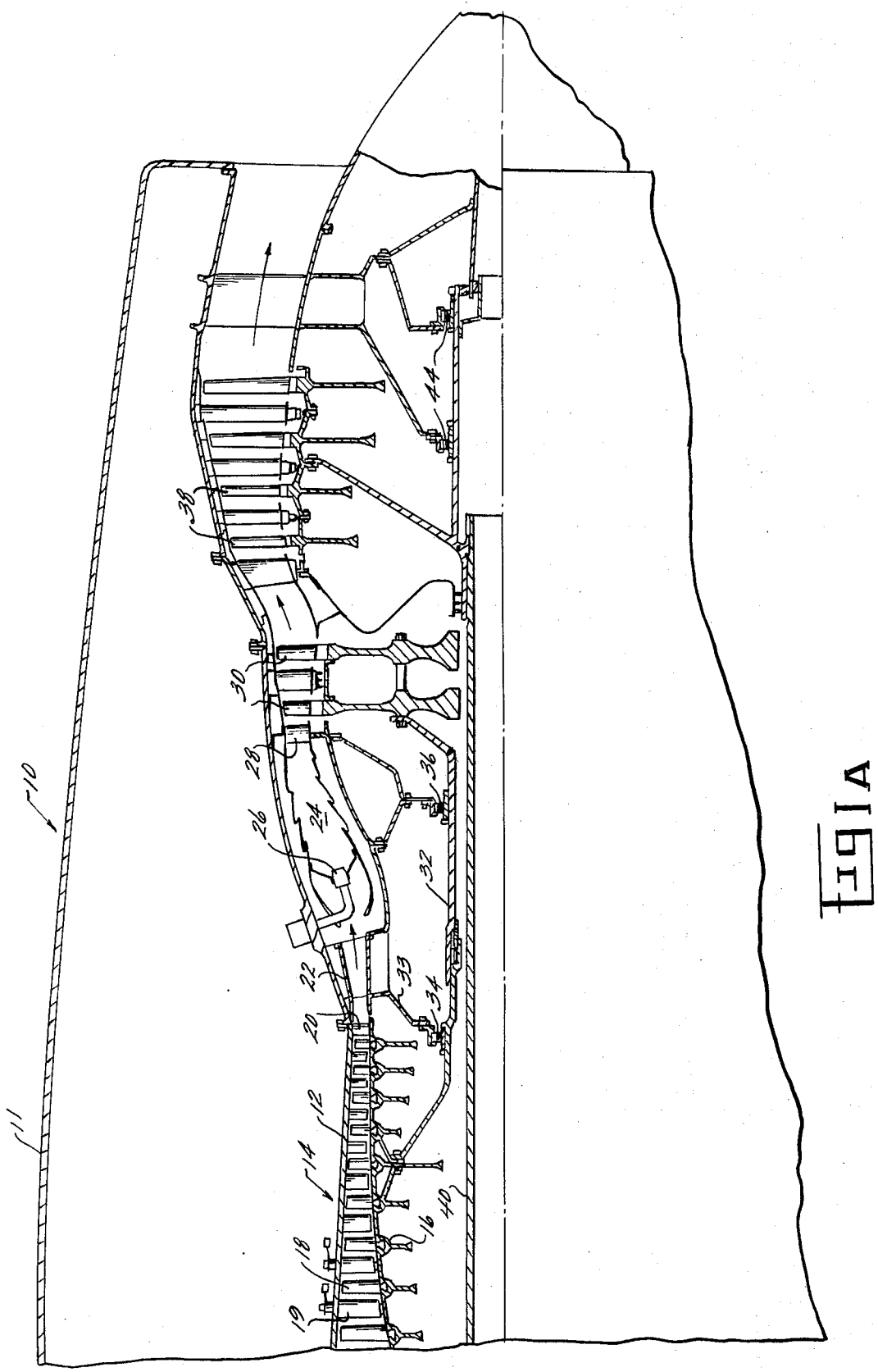
FIG. 1 is a partial cross-sectional view of the conversion means of this invention together with the forward portion of a gas turbine engine to which the conversion means is attached.

Referring to FIGS. 1 and 1A, there is shown a gas turbine engine 10 which has an outer nacelle 11 open at one end to provide an inlet 13 for an axial flow compressor 14. The compressor 14 comprises a rotatable drum 16, having a number of rows of axially spaced blades 18 extending from the surface of the drum 16 so as to impart a velocity pressure to the air passing thereacross. Axially spaced rows of stator vanes 19 extend radially inward from a casing 12 in interposed relation between the rotor blades. Stator vanes 19 may be of the variable type as is well known in the gas turbine art. A series of downstream exit guide vanes 20 and a diffuser passageway 22 enable the static pressure of the air to be increased for discharge to a combustion chamber 24. Fuel is injected into the combustion chamber 24 through a series of fuel nozzles 26, and the resultant mixture ignited to increase the energy level of the gases. Pressurized fuel is supplied to the nozzles 26 from a source which is not shown. The hot gases of combustion are discharged through a turbine inlet nozzle 28 and through a high pressure compressor driving turbine 30, which is connected to drive the compressor 14 through a hollow shaft 32. The hollow shaft 32 is carried with respect to an engine frame 33 by means of a forward bearing 34 and an aft bearing 36. The hot gases of combustion then pass through a low pressure power turbine 38 which drives a power turbine shaft 40 extending forwardly through the hollow shaft 32 and the compressor drum 16. The power turbine shaft 40 is carried with respect to the engine frame 33 by means of a forward bearing 42 and aft bearings 44. The engine herein described is of the free power turbine type and is well known to the gas turbine art.

Conversion means shown generally at 45 are provided and include a bearing ring 46 splined at 48 to the forward end of the power turbine shaft 40 for rotation therewith. Thus it will be appreciated that the conversion means 45 may be slidingly disengaged from the power turbine shaft 40. As is readily apparent the bearing ring 46 is journaled within the bearing 42 so as to carry the forward end of the power turbine shaft 40. A hollow sleeve 50 is splined at 52 to the bearing ring 46 and extends forwardly into splined engagement at 54 with a sun gear 56. The teeth of the sun gear 56 engage at 57 the teeth of a plurality of circumferentially spaced apart planet gears 58 which are rotatably disposed around the sun gear. Each planet gear 58 is journaled for rotation by a pair of coaxially spaced apart bearings 60, 60'. The teeth of the individual planet gears 58 in turn engage at 61 the inwardly extending teeth of a ring gear 62. Ring gear 62 may be of the split type formed from two circular halves held together by an outer combining ring 64. The outer periphery of the combining ring 64 is in splined engagement with a forwardly extending drive ring 66 which is connected to drive a power takeoff shaft 70 through an annular interconnecting drive web 68. The power takeoff shaft 70 is retained for rotation by the bearings 72. As becomes readily obvious, the power takeoff shaft 70, annular drive web 68, drive ring 66, combining ring 64, and ring gear 62 rotate about the center axis of the engine as a unified body at a speed which is generally a fraction of the speed of the power turbine shaft 40. The epicyclic star system so far described is conventionally used for reducing the speed of rotation of a power turbine shaft to a rotational velocity suitable for driving a power takeoff shaft which may in turn power a propeller on an aircraft or, for our particular purpose, an electrical generator 73.

Each pinion gear 58 is internally splined at 80 to a coaxial quill shaft 74 which extends rearwardly into splined engagement at 78 with a respective coaxial pinion gear 76. Each pinion gear 76 is journaled for rotation by a pair of coaxially spaced apart bearings 82, 82'. The teeth of each pinion gear 76 rotatably engage at 83 the gear teeth on a hollow stub shaft 84 which is journaled by bearings 86 for independent rotation concentric to the power turbine shaft 40. Extending forwardly from the rotatable drum 16 is a gas generator shaft 92 carried for independent rotation concentric to the power turbine shaft 40 by the bearing 94. The gas generator shaft 92 may be coupled to rotate with the hollow stub shaft 84 by means of an overrunning clutch which may be of the sprag type shown generally at 88. Other types of clutches other than the sprag type could alternatively be used. When the speed of the hollow stub shaft 84 approximates the speed of the gas generator shaft 92, the overrunning clutch 88 engages the two shafts together and a spline locking means of a type well known to the art and shown generally at 90 may be actuated to hydraulically lock the two shafts together. The spline locking means 90 may be arranged to actuate automatically upon sensing a zero speed differential between the stub shaft 84 and the gas generator shaft 92.

As previously discussed, it has been recently proposed to use gas turbine engines to drive electrical generators in emergency situations where conventional means of power have failed. The emergency power system must be capable of being fully operative within a very short period of time after failure of the main power system. To this end, the gas turbine engine must be capable of being quickly started and accelerated to a normal operating speed under full generator load. In a conventional single rotor type of gas turbine engine, the initial starting torque must be capable of accelerating the combined gas turbine and electric generator rotors to a speed which is well beyond the speed required to initially light off the gas turbine engine. In a single rotor type of engine where the compressor driving turbine is locked to the power turbine, the gas generator cannot provide high aerodynamic torque to the power turbine when the speed of the engine is low. Therefore, a large starting torque would have to be applied to achieve a quick start and the engine starter would likely have to be many times larger than any starter now in existence. The dual shaft engine configuration, however, provides rapid acceleration to high speed with only moderate starting torque by initially accelerating the compressor driving turbine. The initial high gas pressure, temperature, and flow through the compressor driving turbine to the power turbine results in a high accelerating torque applied to the electrical generator. The emergency electrical generator may therefore be rapidly accelerated to its normal operating speed upon failure of a main power system.

After acceleraton to its normal operating speed, the electric generator must be capable of maintaining this rotational speed for changing electrical load requirements. The single rotor type of gas turbine engine, as previously discussed, is most suitable for quickly responding to transients and maintaining a near constant speed. To this end, conversion means have been included to couple the gas generator shaft to the power turbine shaft after the electric generator has been accelerated to its normal operating speed.

During an emergency start the overrunning clutch 88 will be disengaged such that the gas generator shaft 92 and the power turbine shaft 40 rotate independently of each other. During the start cycle the combustion process is initiated and the gas generator, which includes the compressor driving turbine 30, hollow shaft 32, compressor 14, and gas generator shaft 92, is accelerated to its normal operating speed. The resulting high gas pressure, temperature, and flow from the gas generator is applied to the power turbine 38 and rapidly accelerates the power turbine. Power turbine 38 in turn accelerates the electric generator through the interconnecting power turbine shaft 40, sun gear 56, planet gears 58, ring gear 62 and power takeoff shaft 70. Stub shaft 84 is also accelerated through driving connection with the pinion gears 76 which are in turn driven by the planet gears 58 through the interconnecting quill shafts 74. As becomes readily apparent, the stub shaft 84 need not be geared to rotate at the same speed as the power turbine rotor 40.

When the power turbine 38 reaches approximately 95 percent of its operating speed, fuel flow to the fuel nozzles 26 is reduced. This operates to reduce the gas generator speed such that when the speed of the gas generator shaft 92 matches the speed of the stub shaft 84, the overrunning clutch 88 ceases to overrun and engages the two shafts together through the sprags. Thus the gas generator and power turbine act as a single shaft gas turbine system with the power turbine driving the gas generator. This action may be arranged to occur in as short a time as 10 seconds from initiation of the emergency start. Rather than drive continuously through the sprag clutch, which may disengage should the speed of the gas generator again overrun the speed of the power turbine, the spline locking means 90 is actuated. Receipt of a zero speed differential signal between the stub shaft 84 and gas generator rotor 92 operates to actuate the locking means 90 and hydraulically lock the two shafts together. With the two shafts locked together, fuel flow to the fuel nozzles 26 may be trimmed to maintain the operating speed of the electric generator.

The power now delivered to the sun gear 56 is divided between that required to drive the electric generator and that required to drive the engine's gas generator during any transient and off-peak electrical load conditions. The power flow through the star and planet gears to drive the electric generator follows the path previously described for the emergency start-up mode. In addition, the gas generator is driven through the interconnecting gas generator shaft 92, spline locking means 90, overriding clutch 88, stub shaft 84, pinion gears 76, quill shafts 74, and planet gears 58. When the engine is shut down, the clutch will be disengaged, thus freeing the gas generator from the power turbine and the engine will again become a two-rotor machine.

Although the scope of invention is by no means intended to be so limited, it has been found preferable for the particular arrangement so described to utilize five circumferentially spaced apart planet gears 58 in coaxial alignment with five circumferentially spaced apart pinion gears 76. Although the conversion means has been described in relation to a front drive engine, it would also be equally satisfactory for a rear drive engine of the type having a rearwardly extending gas generator shaft and power turbine shaft. Also, it is to be understood that the conversion means for the gas turbine engine arrangement herein described, although particularly well suited for powering an emergency electrical generator, is by no means so limited. It may also be used for powering any machine requiring quick acceleration to operating speed together with a stringent requirement to maintain the operating speed under varying load conditions. Therefore, having described a preferred embodiment of the invention, though not exhaustive of all possible equivalents, what is desired to be secured by Letters Patent is claimed below.

What is claimed is:

1. Conversion means for a gas turbine engine of the type having a compressor, combustor, compressor driving turbine and power turbine in flow series, and including a gas generator shaft connected to the compressor driving turbine for rotation independently of a power turbine shaft connected to the power turbine, comprising:

a sun gear carried for rotation with the power turbine shaft;

a plurality of planet gears carried for rotation with respect to the engine in circumferentially spaced apart relation around the sun gear for simultaneous rotation therewith;

a plurality of circumferentially spaced apart pinion gears carried for rotation with respect to the engine with each pinion gear axially displaced from a respective planet gear and coupled thereto for simultaneous rotation therewith;

a hollow stub shaft carried for rotation with respect to the engine axis and engaged by the circumferentially spaced apart pinion gears for simultaneous rotation therewith; and an overrunning clutch and locking means for coupling and decoupling the gas generator shaft to the power turbine shaft when the power turbine shaft initially accelerates to some predetermined ratio of the speed of the gas generator shaft, wherein the overrunning clutch ceases to overrun and connects the stub shaft directly to the gas generator shaft after which the locking means is actuated to lock the the stub shaft to the gas generator shaft so that the stub shaft and gas generator shaft rotate at identical speed.

2. The apparatus of claim 1 including a ring gear in tooth engaging relation around the planet gears for simultaneous rotation with the planet gears, and a power takeoff shaft rotatably carried with respect to the engine and drivably connected with respect to the ring gear.

3. The apparatus of claim 2 wherein the overrunning clutch is arranged to override only when the rotational speed of the gas generator shaft exceeds that of the stub shaft, and the locking means is arranged to actuate and lock the stub shaft to the gas generator shaft upon receipt of a zero speed differential signal between the stub shaft and the gas generator shaft.

4. The apparatus of claim 1 wherein the power turbine shaft extends forwardly through the compressor, gas generator shaft, locking means, clutch and hollow stub shaft into engagement with the sun gear at the forward portion of the engine.

5. The apparatus of claim 4 including a ring gear in tooth engaging relation around the planet gears for simultaneous rotation with the planet gears, and a power takeoff shaft rotatably carried with respect to the engine and drivably connected with respect to the ring gear.

6. The apparatus of claim 4 wherein the overrunning clutch is arranged to override only when the rotational speed of the gas generator shaft exceeds that of the stub shaft, and the locking means is arranged to actuate and lock the stub shaft to the gas generator shaft upon receipt of a zero speed differential signal between the stub shaft and the gas generator shaft.

* * * * *